United States Patent Office 3,836,567
Patented Sept. 17, 1974

3,836,567
PROCESS FOR THE CONTINUOUS PREPARATION OF UNSATURATED NITRILES
Hans Krekeler, Wiesbaden, Hans Fernholtz, Fischbach, Taunus, Dieter Freudenberger, Diedenbergen, Taunus, Hans-Joachim Schmidt, Frankfurt am Main, and Friedrich Wunder, Florsheim (Main), Germany, assignors to Farbwerke Hoechst Aktiengesellschaft vormals Meister Lucius & Bruning, Frankfurt am Main, Germany
No Drawing. Filed Jan. 17, 1972, Ser. No. 218,506
Claims priority, application Germany, Jan. 19, 1971, P 21 02 263.9
Int. Cl. C07c 121/02, 121/30
U.S. Cl. 260—465.9
10 Claims

ABSTRACT OF THE DISCLOSURE

Process for the preparation of unsaturated nitriles from hydrocyanic acid and esters of unsaturated alcohols and carboxylic acids in the gaseous phase by passing the reaction mixture over carrier catalysts impregnated with a copper(II) salt, a cobalt salt or a mixture of both salts. Preferably, also a Lewis acid is added.

---

The present invention provides a continuous process for the preparation of olefin nitriles by gas phase reaction of hydrocyanic acid with esters of unsaturated alcohols and carboxylic acids having from 1 to 10 carbon atoms, in the presence of metal salt containing catalysts on carrier materials.

The preparation of olefin nitriles is already known: it is carried out by reaction of the corresponding unsaturated halides with metal cyanides in a similar manner as a cyanide alkylation according to Kolbe, where the olefin halides react either with alkali cyanides or with heavy metal cyanides. The analogous reaction of organic halides with basic ion exchangers in the form of cyanide gives only poor yields despite relatively long reaction times.

For the preparation of unsaturated nitriles, also the reaction in the liquid phase of the corresponding alcohols or alcohol/ester mixtures with metal cyanides in the presence of free mineral acid is described.

Besides poor yields, the former processes have the disadvantage of a relatively lengthy and uneconomic technique. As cyanide source, mostly metal cyanide is employed; thus necessarily large amounts, i.e. stoichiometric amounts, of the corresponding metal halides are formed. This does not only cause losses of valuable starting product, i.e. halogen, but also considerable problems arise regarding the removal or use of the metal salts which are formed.

Moreover, when heavy metal cyanides are employed as cyanide source, large amounts of isonitrile and other undesired by-products are always formed.

Also different gas phase reactions are known for the preparation of unsaturated nitriles, for example the reaction of allyl chloride with hydrocyanic acid in the presence of a copper/aluminum oxide catalyst. This process, however, gives only poor yields of olefin nitrile, and simultaneously, a great number of undesired by-products are formed.

Recently, two further processes for the preparation of especially 3,4-unsaturated nitriles by reaction, in the gaseous and in the liquid phase, of corresponding unsaturated carboxylic acid esters with hydrocyanic acid in the presence of copper(I) halide catalysts have been described. Of these two processes, the liquid phase method furnishes good yields, but its disadvantage resides in the fact that the catalyst mixtures dissolved in the liquid reaction mixture for their work-up must be separated in complicated operations and then prepared anew, thus rendering this method uneconomic, especially in a continuous process.

Moreover, the normally insoluble copper(I) halide, which has to be present at least in a molar concentration, must be dissolved and kept in solution in a complicated operation by adding special solutes in order to ensure the activity of the catalyst. Thus, especially in a continuous process, also by-products are retained in undesired amounts which concentrate in the reaction sump during the work-up.

Furthermore, in both processes the copper catalyst must be present in its monovalent form and kept in this state, which requires complicated uneconomic operations under a protecting nitrogen atmosphere and under reducing conditions which have to be strictly observed.

For applying the copper(I) chloride to the carriers employed in the cited gas phase process and for attaining the necessary catalytic activity, also special nitrogen containing solvents are required, the use of which unnecessarily increases the costs of the process and, moreover, causes only a relatively poor space-time yield of the catalysts employed.

A process for the preparation of unsaturated nitriles from hydrocyanic acid and esters of unsaturated alcohols and carboxylic acids in the gaseous phase has now been found wherein the reactants are passed over carrier catalysts impregnated with compounds selected from the group consisting of a copper(II) salt, a cobalt salt and a mixture of both salts, preferably with addition of a Lewis acid.

The carboxylic acids simultaneously formed in this process are recovered in practically quantitative amounts and may thus be used again, according to known methods, for the preparation of the starting materials, thus establishing a closed recycling system for the carboxylic acid component without any of the waste problems of the former processes.

The starting materials employed in the process of the invention, i.e. esters and hydrocyanic acid, may be reacted in an equimolar as well as in a non-stoichiometric mixture. The reactants may be added separately, the hydrocyanic acid advantageously being passed over the catalyst directly in its gaseous form; but they may also be fed in together, a solution of liquid hydrocyanic acid being vaporized in the ester employed, and the vapor mixture being passed over the catalyst. After having passed the reaction zone, the reactant being possibly in excess may be easily separated, fractionated and recycled without any alteration together with the carboxylic acid which has formed. Many variations of the process thus are made possible, as well as an easy handling from a technical viewpoint.

The starting materials are hydrocyanic acid on the one hand, on the other unsaturated esters of an olefin alcohol and a carboxylic acid having from 1 to 10 carbon atoms. Examples of these acids are formic, acetic, propionic, butyric, valeric, caproic, enanthic, caprylic, pelargonic or capric acid, furthermore cyclic, unsaturated or dicarboxylic acids.

As unsaturated alcohols, compounds having from 2 to 8 carbon atoms may be employed, for example allyl or methallyl alcohol, butenol, pentenol, but also olefin alcohols having more than one double bond in the molecule, for example pentadienol, and unsaturated bifunctional alcohols, for example butenediol; the use of which results in the obtention of unsaturated dinitriles.

Reaction products of the process of the invention nearly exclusively are the olefin nitriles desired in each case and the carboxylic acids corresponding to the esters employed. By-products are present only in insignificant amounts. Secondary reactions can be nearly completely avoided, since the product mixture is cooled and condensed immediately after having left the hot reaction zone.

The reaction mixture generally is worked up by fractional distillation. It might be necessary to employ an auxiliary agent in the case where substances of similar boiling points are to be separated. When for example an olefin nitrile such as allyl cyanide is distilled, it is advantageous to separate it from the acetic acid which has formed by adding an amount of water which is forming an azeotropic mixture. Thus, the acetic acid can be recovered in a completely pure form being free from allyl cyanide, although the boiling points of the pure components are differing by only 0.1° C. The pure carboxylic acid so obtained may be reused without further work-up for a new preparation process of ester (for example allyl acetate) according to known methods.

The reaction temperatures of the process of the invention are in the range of from 50 to 350° C., preferably from 100 to 250° C., especially above 150° C.

The reaction may be carried out under a pressure the range of which may be widely varied. Advantageous are pressures of from 0.5 to 50 absolute atmospheres, especially from 1 to 5 absolute atmospheres.

The addition of volatile inert substances, for example nitrogen, does not adversely affect the reaction; on the contrary, this is very advantageous in the case where relatively high boiling esters are used, since the formation of liquid precipitates on the catalysts is avoided and thus their longtime performance is improved.

As catalyst, there are used copper(II) salts or cobalt salts, or a mixture of both salts, preferably as a mixture with Lewis acids, which are applied to suitable carriers. Copper or cobalt halides are preferred as salts. The total amount of the catalyst mixture applied to the carrier material may be very widely varied; generally, it is from 5 to 40% by weight, preferably from 10 to 30% by weight, especially about 25% by weight of the total mass of the catalyst.

It is a rather surprising fact that, in the process of the invention, not the copper(I) compounds described in the former processes, but copper(II) salts and, furthermore, also salts of cobalt alone may be used as catalytically active components for the formation of the nitriles.

The mixing ratio of copper salt and/or cobalt salt, preferably copper halide and/or cobalt halide to Lewis acid may be deliberately chosen. Generally, good results are obtained using catalyst mixtures the components of which are present in about equal amounts.

As Lewis acids, for the process of the invention there may be used for example chromium(III) chloride, manganese(II) chloride, zinc chloride, nickel(II) chloride, aluminum chloride, titanium(III) chloride, beryllium chloride, zirconium(IV) chloride, antimony(III) chloride, bismuth(III) chloride, ferric chloride, tin(IV) chloride, molybdenum(III) chloride, cadmium(II) chloride, boron(III) chloride, gallium(III) chloride, indium(III) chloride, thallium(III) chloride, cerium(IV) chloride, or vanadium(III) chloride. It is also possible to use the analogous bromides, for example molybdenum(III) bromide, aluminum bromide or zinc bromide. Preferably, zinc chloride or nickel chloride, in admixtures as well as alone, are employed as Lewis acids.

As copper and/or cobalt salts, especially copper halides and/or cobalt halides may be employed. Suitable copper salts for the process of the invention are salts of bivalent copper, suitable cobalt salts are those of bivalent cobalt. Apart from the chlorides, also bromides, nitrates, cyanides, sulfates and acetates may be used as salts; the chlorides generally being preferred.

The activity of these salts, especially of the chlorides, is surprisingly superior to that of the salts cited for the former processes. For example, space-time yields of much more than 300 g./l.h. may be attained using the catalyst mixtures composed according to the present invention. However, the catalytic activity of the catalyst mixtures is not attained by simply summing up the activity of each component, which effect previously could not be expected.

Since the process does not require anhydrous operation, it is possible to impregnate the catalysts with the catalytically active substances in an aqueous solution and subsequently to simply dry the catalyst material in known manner.

When the catalyst mixtures in accordance with the invention are used, the hydrocyanic acid is able to liberate the less volatile, higher boiling and more acidic carboxylic acids from their compounds also in the gaseous phase.

Thus, the hydrocyanic acid is a cheap and technically easily obtainable cyanide source.

An insignificant decrease of the catalyst yield observed in the reaction during long time runs of the catalysts can be completely compensated, when necessary, by a short-time interval treatment of the catalysts with a Broensted acid, for example hydrogen halide acids, which is a surprising fact.

Especially advantageous is the simultaneous addition of small catalytic amounts of hydrogen halide gases which are added directly to the gaseous or vapor state mixture of the reactants. By this method, constant space-time yields are achieved without a possibly necessary regeneration of the catalyst in intervals.

The amounts of the Broensted acid possibly to be added are very small; at an average, they are below 10 equivalent percent, relative to the hydrocyanic acid employed. Advantageous are amounts of from 0.01 to 1%, especially about 0.1%. At the same time, the formation of polymer products of hydrocyanic acid, and especially of isomeric nitriles thus is avoided; isomeric nitriles otherwise occurring easily in a neutral or basic pH range. Broensted acids are compounds which are able to yield protons in an aqueous medium. Advantageous for the reaction in accordance with the invention are hydrogen chloride or hydrogen bromide, an addition of hydrogen chloride being especially preferred.

Especially the increase of the space-time yield by adding these acids is surprising, since in the older literature it is held that acids which possibly are formed or are present as free acids during olefin nitrile syntheses, for example hydrochloric acid in the formation of allyl cyanide from CuCl/HCN and allyl chloride, must be constantly eliminated in order to ensure the stability of the nitriles formed.

As carrier material for the catalysts, suitable compounds for the process of the invention are silica dioxide, aluminum oxides, active charcoal, zirconium oxide, aluminum silicates or molecular sievees. But also other carriers may be used.

The gas phase reaction in accordance with the present invention may be carried out as a fluid or fixed bed process. Of the different operation modes, the following method is advantageous for the continuous preparation of olefin nitriles: Hydrocyanic acid and olefin ester are mixed in the desired ratio, the reactants generally being in equimolar amounts. It is preferable to mix the liquid hydrocyanic acid directly with the olefin ester and to introduce this mixture into a vaporizer apparatus. The vaporization temperature depends on the reaction mixture used in each case and generally is above 100° C. The amount added within the unit of time may be chosen as desired and depends only on the dimensioning of the catalyst system connected to the vaporizer. After the vaporization, the now gaseous reaction mixture is passed over the catalyst; a simultaneous addition of nitrogen or another inert gas or steam being favorable sometimes but not necessary. A simultaneous addition of catalytic amounts of hydrogen halide gas brings about a constant, increased catalyst yield.

By a corresponding control, the catalyst temperature is maintained at the desired level. After having left the reaction oven, the reaction mixture being in gaseous or vapor state is immediately cooled and fractionated. Reactants which have not been converted and carboxylic acid which has formed are reemployed correspondingly after their purification.

The process according to the invention so described has the advantage of yielding relatively very pure olefin nitriles in a technically simple and profitable manner with excellent long duration results, which olefins otherwise can only be obtained with simultaneous formation of large amounts of wastes and by-products and with rapidly decreasing catalyst yields.

The olefin nitriles obtained in the process of the invention are valuable organic intermediate products for example for the preparation of epoxy nitriles and unsaturated carboxylic acids.

The following examples illustrate the invention.

EXAMPLE 1

A liquid mixture of 100 g. of allyl acetate (1 mol) and 27 g. of hydrocyanic acid (1 mol) is introduced within 1 hour in a vaporizer flask heated to about 170° to 250° C. Simultaneously, 22.4 l./h. of nitrogen are introducted into the vaporizer flask, and the total vapor mixture is blown at normal pressure into the reaction tube heated to 200° C.

In the reaction tube, 100 ml. of catalyst are present. As catalyst, a mixture of equal amounts of copper(II) chloride and zinc chloride applied to a silicium dioxide carrier, is used.

After leaving the reaction oven, 120 g. of condensate are obtained, which, according to gas chromatography analysis, contain 33 g. of allyl cyanide, corresponding to a space-time yield of 330 g./l.h.

The reaction mixture is worked up by means of fractional distillation. To the residue remaining after having distilled off the lower boiling substances (especially hydrocyanic acid, and traces of allyl chloride), which is composed of allyl cyanide, acetic acid and unreacted allyl acetate, and after having separated the allyl acetate, water is added in an amount necessary to form the azeotropic mixture of allyl cyanide and water having a boiling point of about 89° to 91° C.

The azeotropic mixture, after cooling and condensation, separates into an upper allyl cyanide and a lower water phase. By redistillation of the upper phase containing 97 to 98% of allyl cyanide, a 99.8% allyl cyanide is obtained. Unreacted hydrocyanic acid and allyl acetate are reemployed. The acetic acid obtained in a practically anhydrous state is used for the preparation of starting material.

EXAMPLE 2

In analogy to Example 1, 1 mol each of allyl acetate and hydrocyanic acid in the form of a gaseous mixture are passed over the catalyst of Example 1 within 1 hour at 210° C.

500 ml. of hydrogen chloride gas per hour are introduced additionally.

After 1 hour, 124 g. of reaction product containing 39.8 g. of allyl cyanide are obtained, which results correspond to a space-time yield of nearly 400 g./l.h. After the usual work-up, the allyl cyanide has a purity degree of 98.3%.

EXAMPLE 3

The method is as indicated in Example 1, but there is no addition of nitrogen. 1 mol of the starting materials (allyl acetate and hydrocyanic acid) are passed at 225° C. over 100 ml. of a catalyst impregnated with a mixture of equal amounts of copper(II) chloride, nickel(II) chloride and cobalt(II) chloride. After 1 hour, 105 g. of reaction product are isolated which contains 29.5 g. of allyl cyanide according to gas chromatography analysis. The unreacted products and the acetic acid which has formed are reemployed.

EXAMPLE 4

1 mol each of allyl propionate and hydrocyanic acid are mixed and, after vaporization, the gaseous mixture is passed within 1 hour at 255° C. over 100 ml. of a copper(II)/zinc chloride catalyst. Simultaneously, 5 l./h. of nitrogen are also introduced. After the test has been terminated, 135 g. of reaction solution are obtained, from which 31.5 g. of allyl cyanide are isolated by fractional distillation. When the test is repeated with simultaneous addition of 1.1 l./h. of dry hydrogen chloride gas, 39.2 g. of allyl cyanide can be isolated and separated having a purity degree of 97.9%.

EXAMPLE 5

1 mol each of methallyl acetate and hydrocyanic acid are vaporized and the vapor mixture is passed within 70 minutes over a copper(II)zinc/nickel chloride catalyst which has been heated to 238° C. Simultaneously, 5 l./h. of nitrogen are added. After the end of the run, from 139.3 g. of reaction solution, 40.6 g. of methallyl cyanide having a boiling point of 137–138° C. can be separated by distillation.

EXAMPLE 6

1 mol of 1-butenyl acetate and 0.85 mol of hydrocyanic acid are passed together at 220° C. over a catalyst of a mixture of equal amounts of copper(II)/zinc/ferric chloride applied to 100 ml. of $\gamma$-$Al_2O_3$. 0.2 l/h. of a mixture of equal parts of nitrogen and hydrogen chloride gas are also added.

133 g. of product are obtained, from which 44.5 g. of allyl acetonitrile having a boiling point of 140–141° C. can be separated by distillation.

EXAMPLE 7

1 mol of vinyl acetate is mixed with 0.95 mol of hydrocyanic acid within 1 hour and directly after this mixing operation passed at 165° C. over 100 ml. of the copper(II)/zinc chloride catalyst as described in Example 1.

106 g. of reaction solution are obtained which, besides unreacted starting material, contains a total of 21.8 g. of acrylonitrile. A small amount of acetaldehyde is formed as by-product.

EXAMPLE 8

The method is as described in Example 1. Instead of the copper/zinc chloride catalyst used there, 100 ml. of a cobalt/zinc chloride catalyst applied to $\gamma$-$Al_2O_3$ are employed.

After 1 hour of test period, 124 g. of condensate are obtained which contain 22.4 g. of allyl cyanide.

EXAMPLE 9 (COMPARATIVE EXAMPLE)

The method is as described in Example 8. Instead of the cobalt/zinc chloride catalyst, a pure cobalt chloride catalyst is used in this case. After 1 hour of run, 122.8 g. of condensate are obtained which now contain only 2.5 g. of allyl cyanide. Thus, the catalytic action of the Lewis acid component zinc chloride is clearly proved.

We claim:
1. A gas phase process for the preparation of olefinic nitriles having 3 to 6 carbon atoms selected from the group consisting of acrylonitrile, allyl cyanide, methallyl cyanide, butenyl cyanide and pentenyl cyanide, from hydrocyanic acid and esters of unsaturated alcohols having 2 to 5 carbon atoms, said unsaturated alcohols being selected from the group consisting of vinyl alcohol, allyl alcohol, methallyl alcohol, butenol, pentenol, butenediol and pentadienol and carboxylic acids having 1 to 10 carbon atoms selected from the group consisting formic, acetic, propionic, butyric, valeric, caproic, enanthic, caprylic, pelargonic and capric acid, wherein the reatants are passed at a temperature from 50 to 350° C. and under a pressure of from 0.5 to 50 atmospheres absolute, over a supported catalyst consisting essentially of from 5 to 40% by weight of total catalyst, of a compound selected from the group consisting of the chlorides, bromides, nitrates, cyanides, sulfates and acetates of bivalent copper or bivalent cobalt or mixtures thereof together with a Lewis acid selected from the group consisting of the chlorides or bromides of chromium(III), manganese(II), zinc, nickel(II), aluminum, titanium(III), beryllium, zirconium(IV), antimony-(III), bismuth(III), iron(III), tin(IV), molybdenum(III), cadmium(II), boron(III), gallium(III), indium(III), thallium(III), cerium(IV), and vanadium(III), said Lewis acid being present in an amount approximately equal to that of the bivalent copper compound or bivalent cobalt compound or mixture thereof.

2. A process as claimed in Claim 1, wherein as Lewis acid compounds selected from the group consisting of zinc chloride, nickel chloride, and mixtures of the aforedescribed compounds are used.

3. A process as claimed in Claim 1, wherein the reaction is carried out at temperatures above 150° C.

4. A process as claimed in Claim 1, wherein the reaction is carried out under pressures of from 1 to 5 atmospheres absolute.

5. A process as claimed in Claim 1, wherein as bivalent copper compound a chloride or bromide is used.

6. a process as claimed in claim 1, wherein as cobalt compound a chloride or bromide is used.

7. A process as claimed in Claim 1, wherein as bivalent copper compound the chloride is used.

8. A process as claimed in Claim 1, wherein as cobalt compound the chloride is used.

9. A process as claimed in Claim 1, wherein the reaction is carried out while simultaneously adding a Broensted acid in from 0.01 to 10% of the equivalents of hydrocyanic acid fed, said Broensted acid being selected from the group consisting of hydrogen chloride and hydrogen bromide.

10. A process as claimed in Claim 9, wherein as Broensted acid hydrogen chloride gas is used.

References Cited
UNITED STATES PATENTS

| | | | |
|---|---|---|---|
| 3,558,688 | 1/1971 | Drinkard, Jr. | 260—465.9 |
| 3,711,527 | 1/1973 | Kurtz | 260—465.8 R |
| 3,655,723 | 4/1972 | Drinkard, Jr. | 260—465.3 |
| 3,496,210 | 2/1970 | Drinkard, Jr. et al. | 260—465.3 X |
| 3,062,836 | 11/1962 | Martin | 260—681 X |
| 3,062,837 | 11/1962 | Clark | 260—681 X |
| 3,461,149 | 8/1969 | Hardy et al. | 260—453 AP |

OTHER REFERENCES

C. A., Kurtz, *73* p. 320 (section 87474-m), Oct. 26, 1970.

JOSEPH PAUL BRUST, Primary Examiner

U.S. Cl. X.R.
260—465.2, 465.8 R